(12) United States Patent
Sparks et al.

(10) Patent No.: US 9,467,754 B1
(45) Date of Patent: Oct. 11, 2016

(54) SYSTEMS AND METHODS FOR WIRELESSLY COMMUNICATING WITH UTILITY METERS AND UTILITY METERS USING THE SAME

(71) Applicant: AMI Investments, LLC, Irving, TX (US)

(72) Inventors: Travis Sparks, Irving, TX (US); Reggie Rippetoe, Corinth, TX (US); Charles Kitowski, Colleyville, TX (US); Jeffrey Weiser, Dallas, TX (US)

(73) Assignee: AMI Investments, LLC, Irving, TX (US)

( * ) Notice: Subject to any disclaimer, the term of this patent is extended or adjusted under 35 U.S.C. 154(b) by 0 days.

(21) Appl. No.: 14/974,207

(22) Filed: Dec. 18, 2015

Related U.S. Application Data (63) Continuation of application No. 13/507,758, filed on Jul. 26, 2012.

(60) Provisional application No. 61/574,043, filed on Jul. 27, 2011, provisional application No. 61/627,415, filed on Oct. 12, 2011.

(51) Int. Cl.
*H04Q 9/00* (2006.01)
*H04W 4/12* (2009.01)
*G01D 4/00* (2006.01)

(52) U.S. Cl.
CPC ............... *H04Q 9/00* (2013.01); *G01D 4/002* (2013.01); *H04W 4/12* (2013.01); *H04Q 2209/43* (2013.01); *H04Q 2209/60* (2013.01)

(58) Field of Classification Search
CPC ............... H04Q 9/00; H04Q 2209/40; H04Q 2209/43; H04Q 2209/60; G01D 4/002; Y02B 90/24; Y04S 20/30; Y04S 20/42; Y04S 40/126
See application file for complete search history.

(56) References Cited

U.S. PATENT DOCUMENTS

| | | | |
|---|---|---|---|
| 2005/0055432 A1* | 3/2005 | Rodgers | G01D 4/004 709/223 |
| 2005/0162283 A1* | 7/2005 | Salazar Cardozo | H04Q 9/00 340/870.11 |

(Continued)

*Primary Examiner* — Andrew Bee
(74) *Attorney, Agent, or Firm* — Maynard Cooper & Gale, P.C; Joshua V. Van Hoven (57) ABSTRACT

A communications and control system for use with a utility meter includes a first wireless communications subsystem for exchanging messages with a central facility via a cellular communications network. The first wireless communications system is operable to send messages including meter data generated by the utility meter to the central facility and receive utility control messages from the central facility for controlling the provision of a utility monitored by the utility meter. A second wireless subsystem communicates within a wireless mesh network of compatible wireless subsystems operating in conjunction with a set of utility meters for exchanging the meter data with a selected compatible wireless subsystem within the mesh network.

27 Claims, 6 Drawing Sheets

(56) References Cited

U.S. PATENT DOCUMENTS

| | | | | |
|---|---|---|---|---|
| 2006/0023853 A1* | 2/2006 | Shelley | G01D 4/004 | 379/106.03 |
| 2006/0141940 A1* | 6/2006 | Bloom | G01D 4/002 | 455/73 |
| 2007/0238456 A1* | 10/2007 | Robins | G01D 4/002 | 455/422.1 |
| 2008/0092132 A1* | 4/2008 | Stuber | G01D 4/004 | 717/173 |
| 2008/0177678 A1* | 7/2008 | Di Martini | G01D 4/002 | 705/412 |
| 2011/0016321 A1* | 1/2011 | Sundaram | H04L 63/061 | 713/171 |
| 2011/0095867 A1* | 4/2011 | Ahmad | G01D 4/004 | 340/10.1 |
| 2011/0137826 A1* | 6/2011 | West | G06Q 30/04 | 705/412 |
| 2012/0050064 A1* | 3/2012 | Husney | H04L 12/2827 | 340/870.02 |
| 2012/0147746 A1* | 6/2012 | Shaffer | H04L 47/122 | 370/235 |
| 2012/0242499 A1* | 9/2012 | Ree | G01D 4/004 | 340/870.02 |

* cited by examiner

FIG. 5 ial consumers within very large utility distribution system efficiently and cost effectively.

SYSTEMS AND METHODS FOR WIRELESSLY COMMUNICATING WITH UTILITY METERS AND UTILITY METERS USING THE SAME

CROSS-REFERENCE TO RELATED APPLICATION

The present application claims the benefit of U.S. Provisional Patent Application Ser. No. 61/574,043, filed Jul. 27, 2011, U.S. Provisional Patent Application Ser. No. 61/627,415, filed Oct. 12, 2011, and U.S. patent application Ser. No. 13/507,758, entitled Systems and Methods for Wirelessly Communicating with Utility Meters and Utility Meters Using the Same, filed Jul. 26, 2012, which are incorporated herein by reference.

INCORPORATION BY REFERENCE OF COMPUTER PROGRAM LISTING APPENDIX

The present application incorporates by reference for all purposes the contents of the CDROM, labeled Copy 1 Disk, and an identical duplicate CDROM, labeled Copy 2 Disk, submitted with U.S. patent application Ser. No. 13/507,758 for all purposes. Each CDROM contains one (1) file entitled Code RDM and ERT.txt of 209 kilobytes. This file was created on Sep. 9, 2011 from firmware created Mar. 11, 2011.

FIELD OF INVENTION

The present invention relates in general to the distribution of utilities, and in particular, to wireless communications systems and methods particularly suitable for implementation in utility meters.

BACKGROUND OF INVENTION

With the advent of wireless communications, it is now possible for utility companies to continuously monitor and control services accessed by individual households and corporate users from a centralized facility. Besides significantly reducing the expense and difficulties associated with traditional in-person monitoring of utility usage, wireless utility monitoring and control systems allow for the implementation of additional capabilities that previously were too difficult or expensive to implement on an economically viable scale.

The distribution of electrical power is one particular area where wireless monitoring and control is particularly advantageous. Almost every home or business has an electrical meter that must be monitored, not only for billing generation, but also for the detection of faults and unauthorized consumption. Wireless systems allow for continuous and specific monitoring and control of individual customers within a very large distribution system without an undue amount of human intervention. Consumption is efficiently monitored and billed, faults quickly detected, and unauthorized users identified, all from a centralized location. In the case of unauthorized users, power can be terminated or reduced directly by wireless command.

In addition, wireless monitoring and control gives an electricity provider the ability to effectively control the load on its distribution grid during periods of high demand by managing the distribution of power to individual consumers or groups of consumers. Rolling "brown-outs" or "black-outs" can be pinpoint managed such that critical facilities (e.g., hospitals) are maintained while power to less critical facilities (e.g., individual households) can distributed on an equitable basis. At an even lower level of control, power to specific appliances, such as air conditioners, can be managed to reduce demand on the power grid.

The wireless monitoring and control systems currently available to utility companies are subject to some significant disadvantages. Among other things, most utility companies still maintain their own wireless communications networks for communicating with the meters. These systems are often limited in efficiency and cost effectiveness. Moreover, unauthorized users are often still able to circumvent the controls placed on their meters.

SUMMARY OF INVENTION

The principles of the present invention are embodied in systems and methods supporting two-way wireless communications between a central facility supporting an utility company and meters located at the customers of that company. Among other things, these principles allow wireless communications to be established between the central facility and the meters using a publically available cellular telephone network maintained by a wireless communications company. Different messaging protocols are supported, thereby allowing the most efficient and cost effective protocol to be used depending on the type and amount of data or commands being transferred. Additionally, a local wireless (mesh) network between a group of meters can be set-up and managed, wherein the central office communicates with a single node to transfer data and commands to and from the meters within the group.

According to one embodiment of the principles of the present invention, a communications and control system is disclosed for use with a utility meter, which includes a first wireless communications subsystem for exchanging messages with a central facility via a cellular communications network. The first wireless communications system is operable to send messages including meter data generated by the utility meter to the central facility and receive utility control messages from the central facility for controlling the provision of a utility monitored by the utility meter. A second wireless subsystem communicates within a wireless mesh network of compatible wireless subsystems operating in conjunction with a set of utility meters for exchanging the meter data with a selected compatible wireless subsystem within the mesh network.

According to particular embodiments of the present inventive principles, the first wireless communications system can exchange messaging with the central facility using either SMS or IP messaging protocols. Control messages are included for remotely connecting and disconnecting services associated with the utility meter and/or limit access to those services. In the case of an electrical meter, the central facility can transmit messages for connecting the metered user to electrical power, disconnecting that power, limiting the available current, or limiting access duration.

In further embodiments, the second wireless subsystem is operable collects meter data from at least one other compatible wireless subsystem for transmission to the central facility in a message via the first wireless communications subsystem and the cellular communications network. For an electrical meter embodiment, the meter data may include current, voltage, outage status, time of use, and tampering data.

Embodiments of the present principles advantageously allow an utility company to monitor and control individual meters within a system having a very large number of such meters. Consumption of a particular user can be monitored and efficiently billed. Faults, such as an excess current draw in the case of electricity, can be wirelessly identified and power to the given meter reduced or halted. Unauthorized usage, or usage exceeding a specified amount, can be similarly constrained or halted. Under excess demand conditions, rolling blackouts or brownouts can be managed on a pinpoint basis.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-5 of the drawings, in which like numbers designate like parts.

Figure 1A:
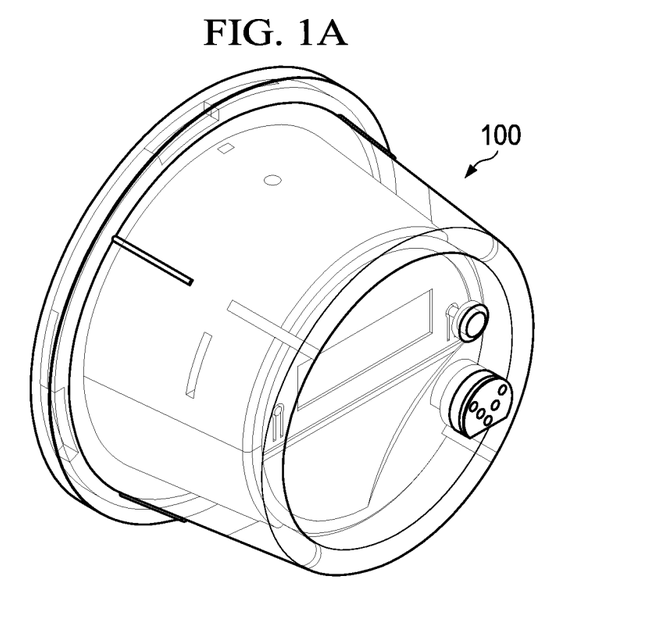
FIG. 1A is a diagram showing an integrated utility meter and multiple-mode wireless communications system embodying the principles of the present invention.

FIG. 1A is a diagram of an exemplary integrated utility meter and multiple-mode wireless communications unit 100 embodying the principles of the present invention. As discussed in detail below, unit 100 allows a utility provider, or a third party contractor, to remotely monitor and control utility consumption by an end user through conventional electronic metrology circuitry and switches (i.e., switches 103 shown in FIG. 2) provided in a conventional meter plug-in base (see FIG. 3C, metrology circuit board 305 and meter base 308). In the illustrated embodiment, meter unit 100 implements an electric power meter, although the principles of the present invention are readily applicable to other types of utility meters, such as gas and water meters.

Among other things, meter unit 100 supports multiple modes of wireless communications between the utility provider (or its third party contractor) and the end user, including different wireless transmission protocols and different messaging options. Advantageously, meter unit 100 allows the utility provider to select the most efficient and/or cost effective communications system required to implement various metering functions (e.g., consumption, time of use, voltage, current, outage status, and tamper status), control functions (e.g., remote disconnect and remote connect), and local data processing. Meter Unit 100 is suited for use with households, apartment complexes, commercial establishments, and in general most private and public buildings.

Figure 1B:
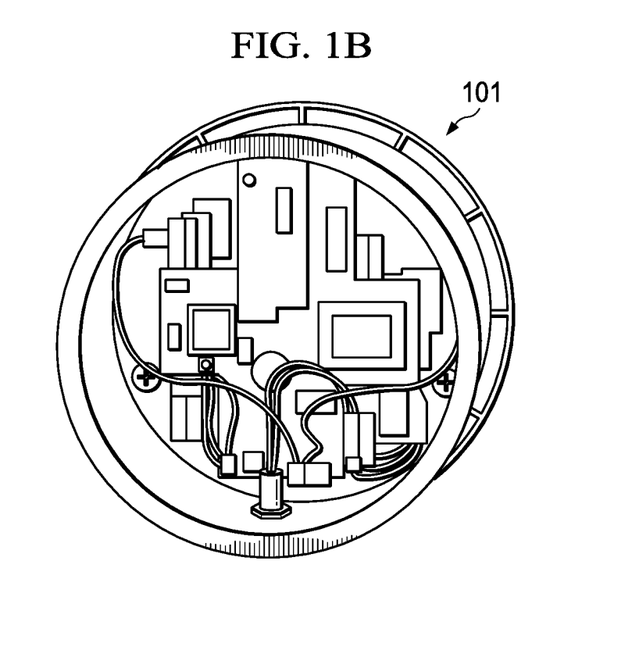
FIG. 1B is a diagram of an utility meter collar system suitable for use in conjunction with a conventional utility meter and a multiple-mode wireless communications system according to the principles of the present invention.

FIG. 1B is a diagram of a meter collar 101 embodying the principles of the present invention and designed to receive a standard electricity meter plug-in, which typically does not include metrology circuitry. In the collar embodiment, system 200 discussed below is primarily used for control of the user's consumption, such as remote connect and disconnect, and tamper detection.

Figure 2:
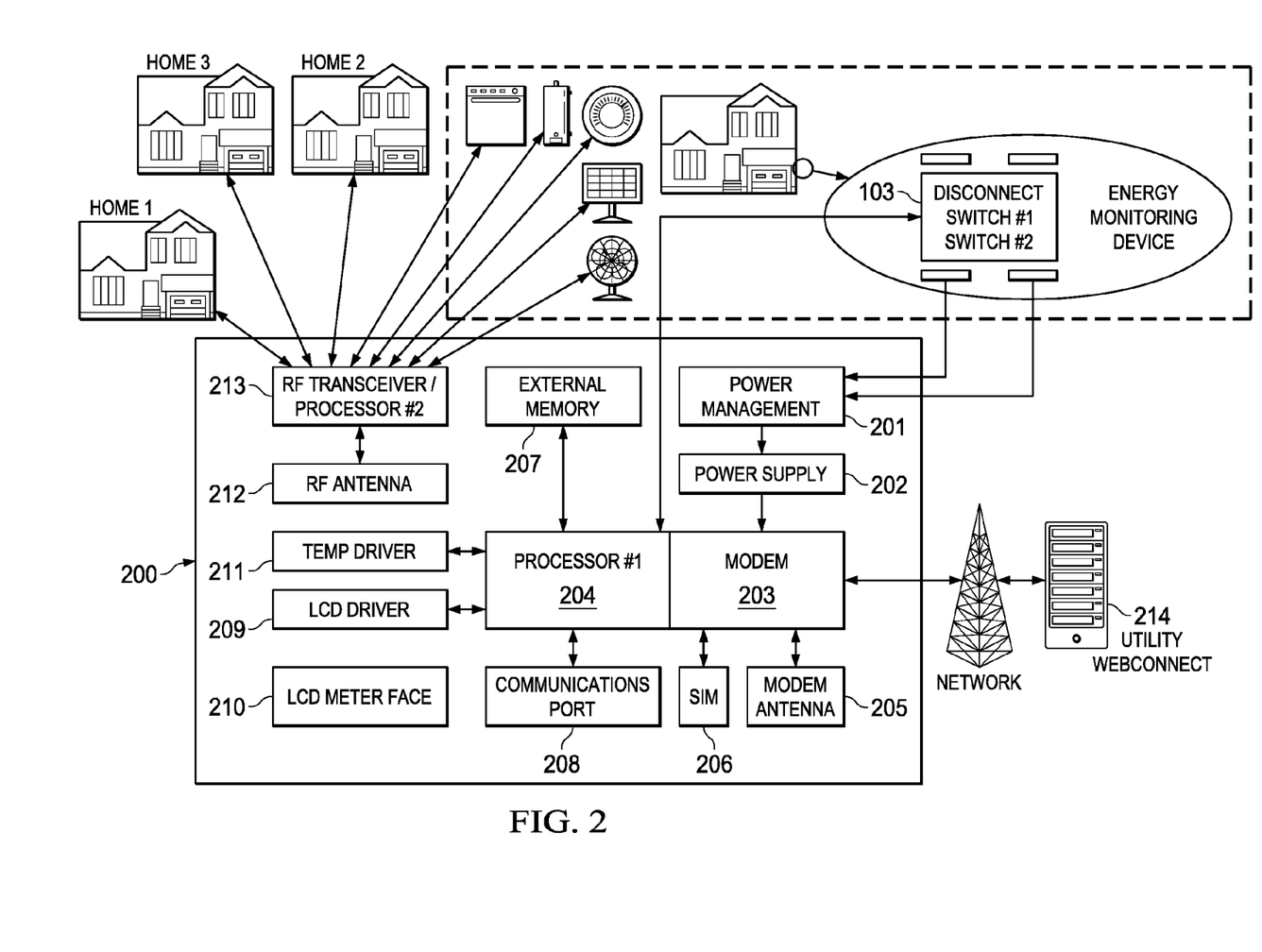
FIG. 2 is a functional block diagram of a representative multiple-mode wireless communications system embodying the principles of the present invention and suitable for use in conjunction with the utility meters of FIGS. 1A and 1B.

FIG. 2 is a high level functional block diagram of communications and control system 200. In the illustrated embodiment, communications and control system 200 connects to traditional 240V single-phase electric power lines (not shown) and includes conventional metering board in the base of unit 100 that provides metrology data such as voltage, current, consumption (in volt-amps per hour or kilowatts per hour), and emulated watt disk data. Consumption data is output from the metering board using a standard serial interface. Similar known metrology units are used to measure consumption and other usage parameters in embodiments of the present principles used in gas and water utility applications. A pair of conventional switches 103, one for each phase of the input power, are provided in the unit base to connect and disconnect the end user to the power supply lines under the control of control system 200.

In the illustrated embodiment, power from the conventional spades of the meter is tapped and passed through power management circuitry 201. As discussed below in conjunction with FIG. 4, power management circuitry 201 includes filter and surge protection circuitry for providing power to the electronics of communications and control system 200. The 240V two-phase power received from the meter spades is in the common mode and meter unit 100 floats, so a virtual ground for the electronics is created between unit 200 and the underlying metrology board.

The 240V two-phase filtered power output from power management circuitry 201 is provided to a power supply 202, which is preferably a Mean Well NFM-10 series switching power supply outputting 3.3 V nominal for supplying the electronics of communications and control system 200. Power supply 202 is preferably separated and isolated from the power supply for the metrology board.

Advantageously, power supply 202 has a relatively heavy transformer coil and does not employ output clamping or shunting. Consequently, the energy stored in the transformer core supports the power supply output with a current of about 2 amps for approximately 1 to 2 seconds after a power disruption, for example, from a failure of the grid or a disconnect of one or both of the input power lines. As discussed further below, this additional current output allows either the wireless modem or the radio frequency transmitter to issue a message indicating power disruption to the utility provider. As shown in FIG. 3B, power supply 202 resides on a dedicated board 302 adjacent to the back face of primary board 301.

A wireless modem 203 supports standard cellular communications with the utility provider across a commercially provided cellular communications network. Advantageously, the utility provider has a choice of communications carriers and is relieved of the responsibility of maintaining its own network. This is in contrast to typical utility monitoring systems, where the utility maintains its own network and therefore must address any subsequent communications network problems, in addition to its primary utility business.

In the illustrated embodiment, wireless modem 203 is a Wavecomm Q2687-RD quad band modem, which supports standard cellular (mobile) communications in either the GSM 850 MHz, E-GSM 900 MHz, DCS 1800 MHz, or PCS 1900 MHz bands.

Wireless modem 203 operates in conjunction with a system processor 204, which is preferably a TI MSP 430 microcontroller. Exemplary code for the control of system processor 204 is found in the appendix (i.e., the "TI" portion of the code). Wireless modem 203 and system processor 204 preferably communicate via a standard serial interface, such as an SPI or I²C bus.

Figure 3A:
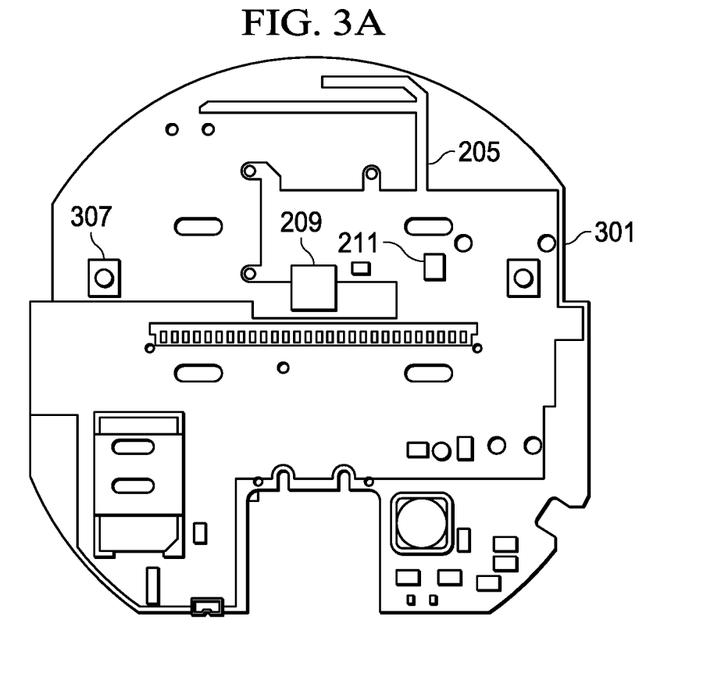
FIGS. 3A-3D are diagrams illustrating the printed circuit boards in one representative embodiment of the utility meter of FIG. 1A.
Figure 3B:
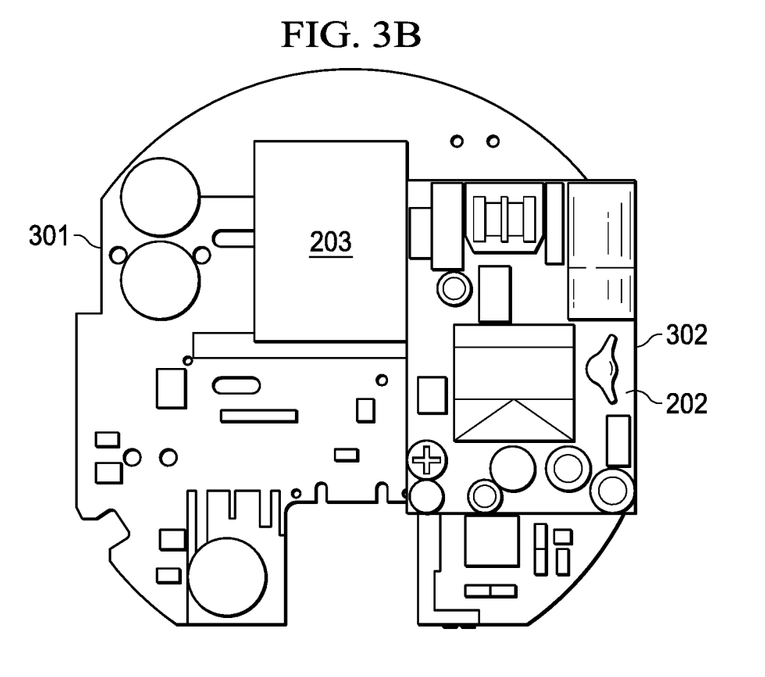

To support quad band communications, system 200 includes a quad band foil antenna 205 formed on one face of a summary circuit board 301, shown in FIG. 3A. Antenna 205 generally takes the shape of an inverted "f" and floats above the multiple-layer copper circuit board ground plane, in contrast with similar conventional antennas, which are grounded. Advantageously, the floating antenna 205 is less susceptible to noise caused by pulses of electromagnetic radiation in the vicinity of unit 100 (e.g., a lightening strike). Circuit board 301 contains multiple cavity style RF traps built into the geometry of the ground plane as well as discrete filters built with surface mount components to trap, shunt, and reduce harmonics of the 850 MHz and 1900 MHz cell phone bands. This combination yields efficiencies to cell band antennas in electric meter applications and overcomes the form factor limitations imposed by the meter dimensions.

Antenna 205 acts as a half-wavelength antenna for the GSM bands and as a quarter-wavelength antenna for the PCS and DCS bands. Alternate embodiments of circuit board antenna 205 contain series and parallel passive components that allow the antenna to have the characteristics of a folded dipole in the upper bands and a bent monopole antenna in the lower bands.

A conventional Subscriber Identity Module (SIM) 206 assigns meter 100 a cellular telephone number for communications. Advantageously, SIM 206 allows the utility to configure meter 100 to operate with any one of a number of different wireless communications carriers, as well as providing a unique identifier for system 200.

Configuration code, as well as data from the metrology board, are stored in non-volatile external memory 207, which preferably is Flash memory. Metrology data cycles in a first-in-first-out manner, with older data being overwritten by new data. As discussed further below, the utility company has a number of options with regards to the frequency at which metrology data is collected, the amount of data formatted into a message, and the frequency at which messages are pushed to or pulled from system 200. Generally, the amount of data stored at any one time is a function of the amount and type of data taken with each measurement, the frequency at which measurements are taken, and the frequency at which data are returned.

Wireless modem 203 and system processor 204 allow the utility provider to communicate in different modes, depending on the amount of data being transferred per message and the frequency of the messages. In the illustrated embodiment, messages are sent using ASCII code as either a cellular connection using the Transmission Control Protocol (TCP)/Internet Protocol (IP) or as a Short Message Service (SMS) messages. For short messages (i.e., less than 160 characters), data are transferred using the SMS protocol, which typically has reduced expenses for the cellular services subscriber and decreases the power loading on system 200. (A wireless connection using TCP/IP connections through wireless modem 203 can require up to two amps of current draw on power supply 202). On the other hand, a full wireless data connection, significantly more data can be transferred per session. Exemplary messages are discussed below. In the illustrated embodiment, although larger messages are exchanged using TCP/IP connections and a full wireless connection, this is not a requirement to practice the present principles.

Wireless modem 203 preferably enters a sleep mode between messages to save power and reduce noise within the remainder of the system. Wireless modem 203 can then receive wake-up command via an SMS message, after which communications may be established using TCP/IP messaging. Similarly, system processor 204 enters a sleep or low power mode when a sleep timer indicates a lack of activity for a programmed interval. System processor 204 will typically enter the sleep mode between wireless messages and between the receipt of metering data from the metrology board within the meter base.

A port 208, which could be an IR port, a hard-wired serial port, or both, provides an alternate path for accessing metrology data stored in memory 207. A hardwired port, when provided, also allows configuration changes or upgrades to system 200, either in the shop or in the field.

Consumption data can be directly read from an LED display system including an LCD meter display 210, and LCD driver 209, and a temperature driver 211. As shown in FIG. 3A, temperature driver 211 measures the temperature directly at the back of LCD meter display 210. LCD driver 209 then adjusts the contrast on LCD meter display 210 as a function of temperature by generally reducing the LCD drive voltage with increasing temperature, and vice versa.

In the preferred embodiment, a look up table is employed to determine the proper drive voltage for the temperature of the LCD so that the contrast remains consistent over temperature. In contrast to existing meter systems, system 200 does not use a separate temperature sensor in the immediate vicinity of the glass on the face of LCD display 210 to control the display. Instead, the temperature of the glass is calculated using temperature driver 211 and adjusting the contrast look up table value as a function of the amount of ac current passing through meter 100. (The temperature of LCD display 210 will generally be a function of the current draw of the user, the heat generated by the electronics within unit 100 or 101, and sunlight entering the unit enclosure.) This configuration eliminates the dedicated temperature sensor for LCD contrast, thus reducing parts and assembly costs.

Figure 3C:
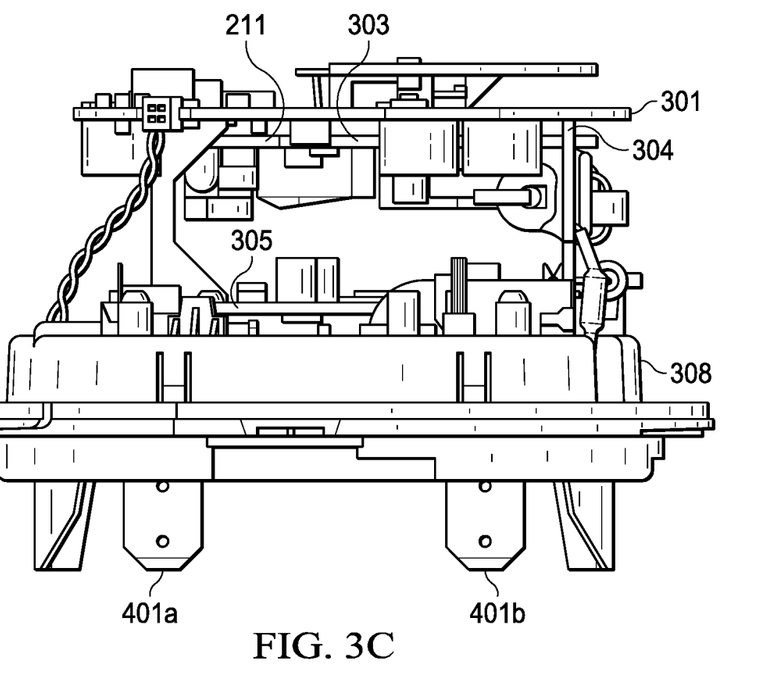

System 200 implements a second wireless communications subsystem for establishing a mesh network between different users or between appliances within a single user node (e.g., a household or apartment). This mesh network subsystem includes an RF transceiver and processor mesh unit 213 and an RF antenna 212. As shown in FIG. 3C, mesh network subsystem 213 is disposed on a dedicated printed current board 303 disposed on the back face of primary circuit board 301, generally parallel to wireless modem 203.

In the preferred embodiment, mesh unit 211 includes a second TI MSP 430 microcontroller and a Sierra Wireless transceiver. Communications are implemented using a 915 MHz band frequency hopping spread spectrum protocol, which allows for emulation of the proprietary Itron ERT® SCM ("Electronic Receiver Transmitter") transmission protocol. The data protocol used for mesh establishment and communications can also be a standard protocol, such as the ZigBee protocol. Exemplary code for the second TI MSP 430 microcontroller is also provided in the appendix (i.e., the "ERT" portion of the code).

One advantage of a mesh network connection is the ability to consolidate data from a set of meter units 100, generate messages from the consolidated data, and then transmit those messages from a single master wireless modem 203. The master wireless 203 may be in a selected one of set of meter units 100 or at a dedicated node. A meshed-network, for example, could be used in a subdivision or apartment complex where only a small number of cellular wireless modems 203 are required.

Hence, meshed network configuration minimizes the expenses and complexity of a system relying on multiple wireless modems 203. In some embodiments of the present principles, wireless modem 203 may be eliminated from all but the meter units 100 acting as master nodes. In other embodiments, wireless modems 203 may be eliminated altogether, with the utility company downloading user data directly from the mesh network wirelessly, through a mesh unit 213 for example with a mobile, RF transceiver.

Additionally, the processor within mesh unit 213 can be programmed wirelessly from an external source. For example, mesh unit 213 can be programmed from a high power mode to a low power mode via an over-the-air firmware change in system processor 204 and/or the second processor within mesh unit 213. Moreover, mesh unit 213 may be configured by direct connection or via over-the-air commands to set the "ERT" identification number, rate of transmission, number of transmissions, RF power out level (which allows for the emulation of high powered and low powered ERTs). Mesh unit 213 also can act as a stand-alone ERT reader, and can read nearby ERTs, either sorting by specific ID numbers or acting as a global collector and forwarding all ERT messages received to the network via wireless modem 203.

Mesh unit 213 preferably can also communicate within a user network such as the Home Automation Network (HAN) to effectuate demand load control, time of use pricing, appliance interactivity, intelligent thermostat control, electric car charging, and in-home displays. In cases of heavy demand, an electric utility company, could, for example, reduce loading on the grid by reducing consumption by high demand appliances, such as air conditioners, water heaters, and swimming pool pumps, rather than by complete rolling blackouts or brownouts.

Figure 3D:
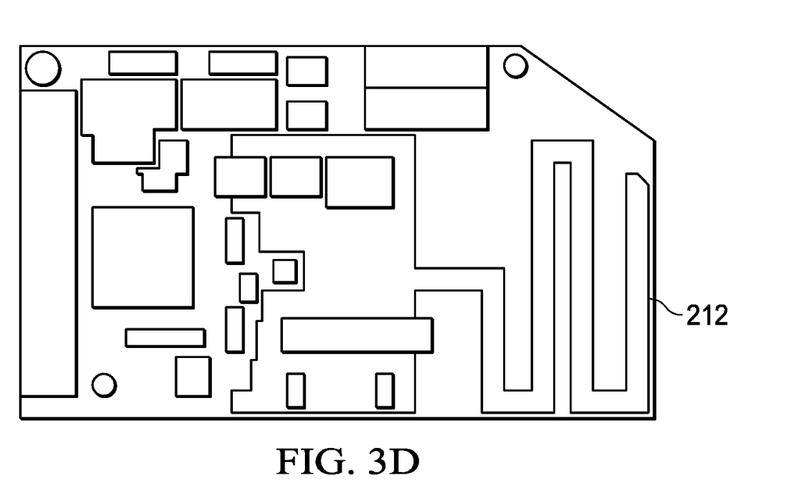

Antenna 212, shown in FIG. 3D, is preferably a folded whip antenna that floats above a ground plane of the (i.e., antenna 212 is not grounded like typical antennas). The floating configuration helps in protecting antenna 212 from surges and noise.

Utility WebConnect system 213 manages command messages being sent to meter unit 100 and the return of information from meter unit 100. Through SMS messaging or cellular TCP/IP connections, a utility provider can implement a wide range of features. An exemplary set of commands that a utility can use are shown in Table 1.

Generally, a utility company can remotely connect, restrict a user's consumption or completely disconnect a user. A connection may be established, for example, for the new occupant of a home or apartment. A reduction in service or a complete disconnect can be voluntary or involuntary. A voluntary restriction on service might occur, for example, if a user is paying for service on a pay-as-you-go or pre-paid basis.

An involuntary restriction on service or complete disconnection might occur, for example, for failure to make payments, consumption of excess current, tampering with meter 100, or on the detection of unauthorized use by the user. Advantageously, system 200 can generate reports on tampering or unauthorized use, as detected by the metrology unit for transmission to the utility provider. Tampering and unauthorized use can be detected, for example, by observing reverse current flow, back-feed, tilt and over-current conditions.

The message structure for wireless communications between system 200 and utility WebConnect system 214 is generally designed to: (1) Provide a high level of security; (2) reduce the risk of false activation of meter units 100 to an insignificant level; (3) provide a high level of corrupt message detection; and (4) provide flexible structure for future expansion. In the illustrated embodiment, messages include Command Messages sent from the utility provider to initiate an action and Unsolicited Messages sent from meter 100 either upon the occurrence of an event or periodically, without the need for polling by the utility provider master system.

The message structure, as well as message content, will vary from embodiment to embodiment of the principles of the present invention, as implemented by the particular programming for wireless modem 203, system processor 204, the processor of mesh unit 214, and/or utility web connect system 214. In the tables, "Pre-Pay" messages generally concern utility customers who have pre-paid for a particular amount of service, "Collar" messages pertaining only to the collar unit 101 shown in FIG. 1B, "Meter" messages only for full meter units 100, and "Both" for messages related to both full meter units 100 and collar units 101. On Table 1, "meter unit" means the indicated unit 100, collar unit 101, or both.

To upgrade the firmware in meter 100, utility WebConnect 214 sends an SMS message to meter 100 commanding meter 100 to retrieve a binary file from a back-end server on the network system and reprogram the firmware for either system processor 204 or the mesh unit 213 processor. More particularly, after receiving the command, meter 100 initiates an IP socket connection via wireless modem 203 to the back-end server requesting that the binary file be sent to it in 64 byte packets. Once all of the bytes have been received, error checked, and stored in the non-volatile memory 207, the given microcontroller will initiate the re-write process.

A section of code (e.g., boot loader) will always reside in system processor 205 and/or the mesh unit 213 processor and manages the erasing of the rest of the corresponding program code blocks in assigned memory. Once system processor 204 or the mesh unit 213 processor has erased all of the code except for the boot loader portion, it will read the firmware image stored in non-volatile memory 207 and program it into the eased portions of the local memory. Meter unit 100 will then reboot and send a message that it has successfully completed a firmware upgrade.

Time of use (TOU) information can be requested by WebConnect system 213 by using either an SMS message or a wireless connection and the IP protocol. (TOU information is particularly useful for pre-paid user accounts.) Generally, the two methods are mutually exclusive, such that a request via SMS must generate an SMS response and an IP request must generate an IP response.

In the illustrated embodiment, the TOU option must be enabled by the command shown in Table 1, preferably by an SMS message. After receiving the command, meter unit 100 responds with an acknowledgement that the command was received and processed. If no acknowledgement was received then the command times out and must be resent. TOU use is similarly disabled by an SMS command.

If TOU is enabled, meter 100 responds back with the packet number requested. A typical response message will include the meter reading and the date and time of that meter reading. The response is repeated as necessary to give meter readings spaced by time and/or date intervals set during enablement of the TOU feature. The first packet (e.g. Packet 000) is preferably the most current meter data.

In the illustrated embodiment, memory 207 generally has the capacity to store up several days, or even a month or more, of information, such that the utility company can download a sequence of meter readings taken over a defined period of time. For example, meter readings taken at one hour intervals spaced over a single day could be sent to the utility provider every midnight, every other day, once a week, and so on.

When the utility provider only requires small amounts of data, for example periodic meter readings of single data points, SMS messaging is the preferred vehicle, given the reduced expenses and overhead burden on system 200. In the case of SMS, messages are preferably encrypted at WebConnect system 215 and system 200 using an encryption method of the utility provider's choice.

When larger amounts of data are being transferred, for example meter readings for several days, the IP protocol across a wireless cellular connection is preferable. In this case, most wireless carriers encrypt data using industry standard encryption routines.

WebConnect system 214, along with the messages and commands of Table 1, implement a number of additional important functions. For example, zeroing meter 100 or setting current limits on the user. Records onboard meter 100 also indicate the date and time of a power outage and the date and time when power was restored, and are retrievable on command by WebConnect system 214.

Meter 100 also logs instances of tampering (e.g., movement of meter 100) and unauthorized use. These logs can be retrieved from by WebConnect system 214 by a Poll command and the Close command used, as deemed appropriate, to disconnect the user.

As discussed above, power supply 202 provides about one to two seconds of additional power at approximately two (2) amps after a power outage. The unsolicited Grid Power Failure Message, which can be sent via either an SMS or IP protocol message, provides a "last gasp" indication to WebConnect system 214 that a power outage has occurred in the power grid encompassing the area in which meter 100 resides.

Meter Unit 100 is normally sealed by the utility provider to prevent or detect tampering. Some embodiments of the principles of the present invention include an external button, which is enabled by remote command by the utility provider, allowing an end user to connect and disconnect service. Additional embodiments of meter 100 include an internal button, such as button 307 shown in FIG. 3A, which is only accessible by personnel authorized to break the seal on meter 100 and is only operable when activated by the proper wireless command to system processor 204.

The sealing of meter unit 100, along with the ability to remotely detect tampering, provides an additional advantage, namely, that the proprietary hardware, software, and hardware within system 200 is also protected against unauthorized access. The ability to detect tampering both remotely and by observation of the seal is particularly important given that wireless modem 203 and SIM 206 provide access to a wireless network, which could allow an unauthorized party to appropriate system 200 as a communications device and/or hack into the utility company's system. The ability to detect tampering this is also important to ensure unauthorized access and assumption of control over meter 100 through mesh unit 213, as well as unauthorized access to electrical power.

Different meter bases may be used in integrated meter unit 100, as well as with collar 101. Differing bases may also used different types of switches 103, which generally are power relays rated nominally at 240 VAC and 200 amps on the switched power lines. Some relays may be either continuous duty or latching DC controlled relays. Other relays may be continuous duty or latching AC controlled relays. Advantageously, system 200 can be programmed to provide the proper voltages for the type of relays used in the selected base.

In the case of DC relays, programmable drive circuitry within power management block 201 is programmed to the required nominal relay control voltages and then monitors and maintains those voltages within tolerances. For AC controlled relays, the drive circuitry is programmable for control voltage, as well as duty cycle and AC phase angle switch on and off times.

Figure 4:
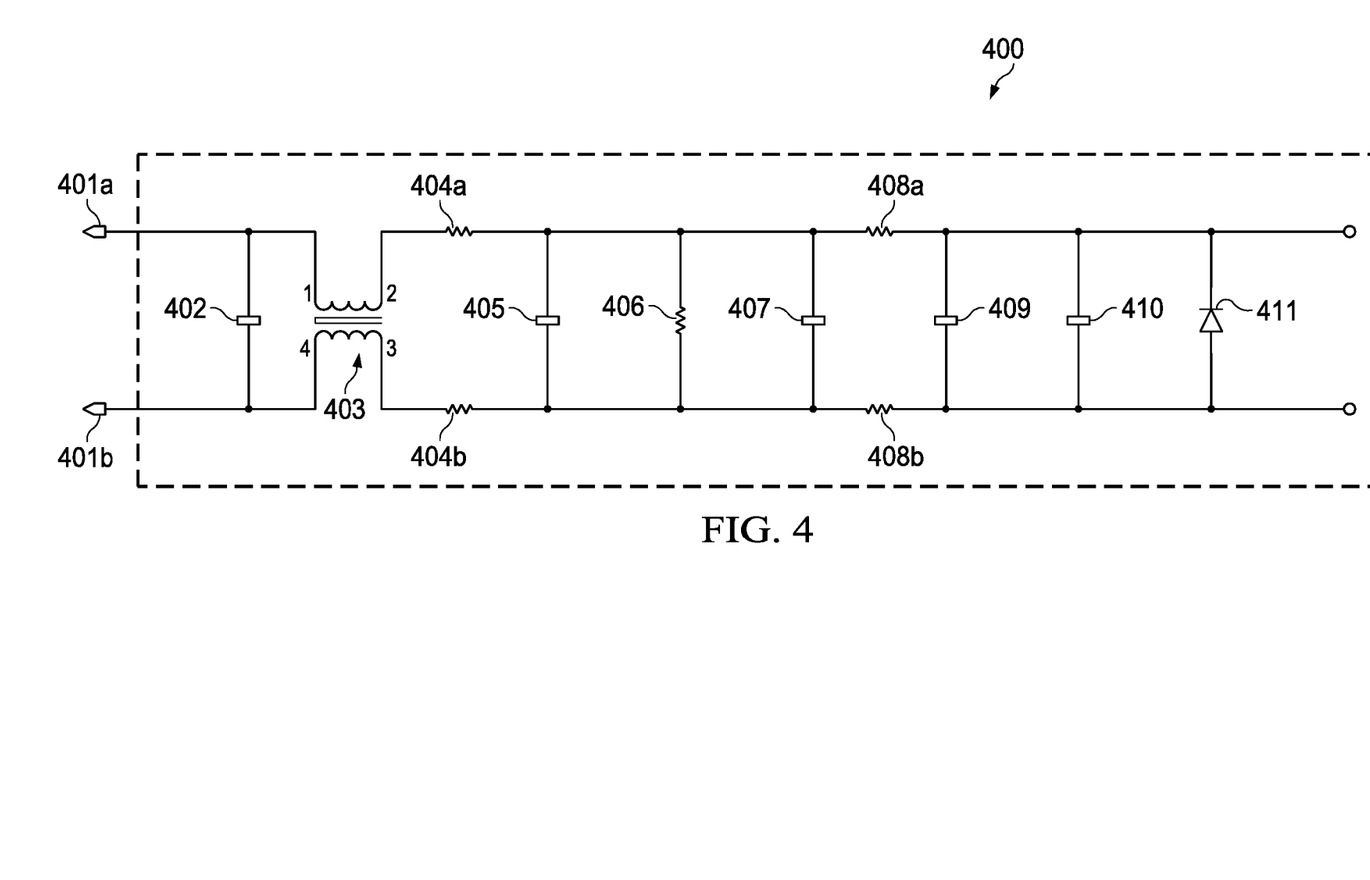
FIG. 4 is an electrical schematic diagram of a representative power filter according to the principles of the present invention and suitable for use in the power management circuitry shown in FIG. 2.

FIG. 4 is an electrical schematic diagram of power filter 400 within power management unit 202 of FIG. 2. Power for system 200 is tapped from the conventional spade connectors 401a and 401b on the unit base 308 and receive 240 volt single-phase ac power. Filter 400 is disposed on filter board 305, which, as shown in FIG. 3C, extends general orthogonal to primary circuit board 301 and metrology circuitry board 305 on unit base 308.

A gas discharge tube 402, preferably with a nominal breakdown voltage of 600 volts, bridges the filter input and controls voltage spikes and similar overvoltage conditions. The power inputs then pass through a common mode choke 403, which is rated, for example at 6.8 mH, and 1.7 amps. The two lines line on the output side of choke 403 pass through power resistors 404a and 404b having an exemplary resistance of 580 ohms and rated at 5 watts.

Across the outputs of resistors 404a-404b are a second gas discharge tube 405 and a metal oxide varistor (MOV) 406, which provide additional protection against voltage spikes and other overvoltage events. Second gas discharge tube 405 has an exemplary breakdown voltage of 600 volts. MOV 406 is, for example, a Littlefuse V275LA40AP MOV.

A filtering capacitor 407 (e.g., 0.1 uF, 100 ohms, 600 watts) is provided between the AC lines, followed by a second set of power resistors 408a-408b, also having an exemplary resistance of 580 ohms and rated at 5 watts. Resistors 408a-408b are followed by filtering capacitors 409 (e.g., 0.0018 uF, 2.5 kV) and 410 (e.g., 0.1 uF, 400 V). A transient voltage suppression diode 411 (e.g., 320 V) clamps the output of filter 400 in the event of voltage spikes.

In addition to protection against current surges and high voltage transients, filter 400 also generally acts as a hybrid Pi-Butterworth filter for removing noise on the input AC power lines.

Common mode choke 403 generally blocks high frequency common mode noise caused, for example, by a lighting strike in the vicinity of meter 100 or a similar surge event that injects noise onto the ac power lines. Noise and voltage spikes that pass through with the differential power signal are shunted by gas discharge tube 405, MOV 406, and/or diode 411. According to the principles of the present invention, filter 400 is disposed on a filter board 304 generally orthogonal to the main board 301 of system 200 and the metrology printed circuit board 305, as shown in FIG. 3C. Common mode choke 403 is disposed on filter board 302 such that its longitudinal axis is parallel to the ground plane of the underlying metrology board 305.

In this configuration, the magnetic (B) field generated by common mode choke 403 is generally parallel to the plane in metrology base printed circuit board 305. In response to high current, high frequency, common mode transients on the AC input power lines, an image current to the common mode high frequency current is established in the metrology board ground plane. The magnetic field of this image current will tend to cancel-out at least some of magnetic field of the transient current, assisting in dissipating the energy of the current transient. Additionally, capacitive coupling between choke 403 and the metrology board ground plane will couple some high frequency energy to ground.

Figure 5:
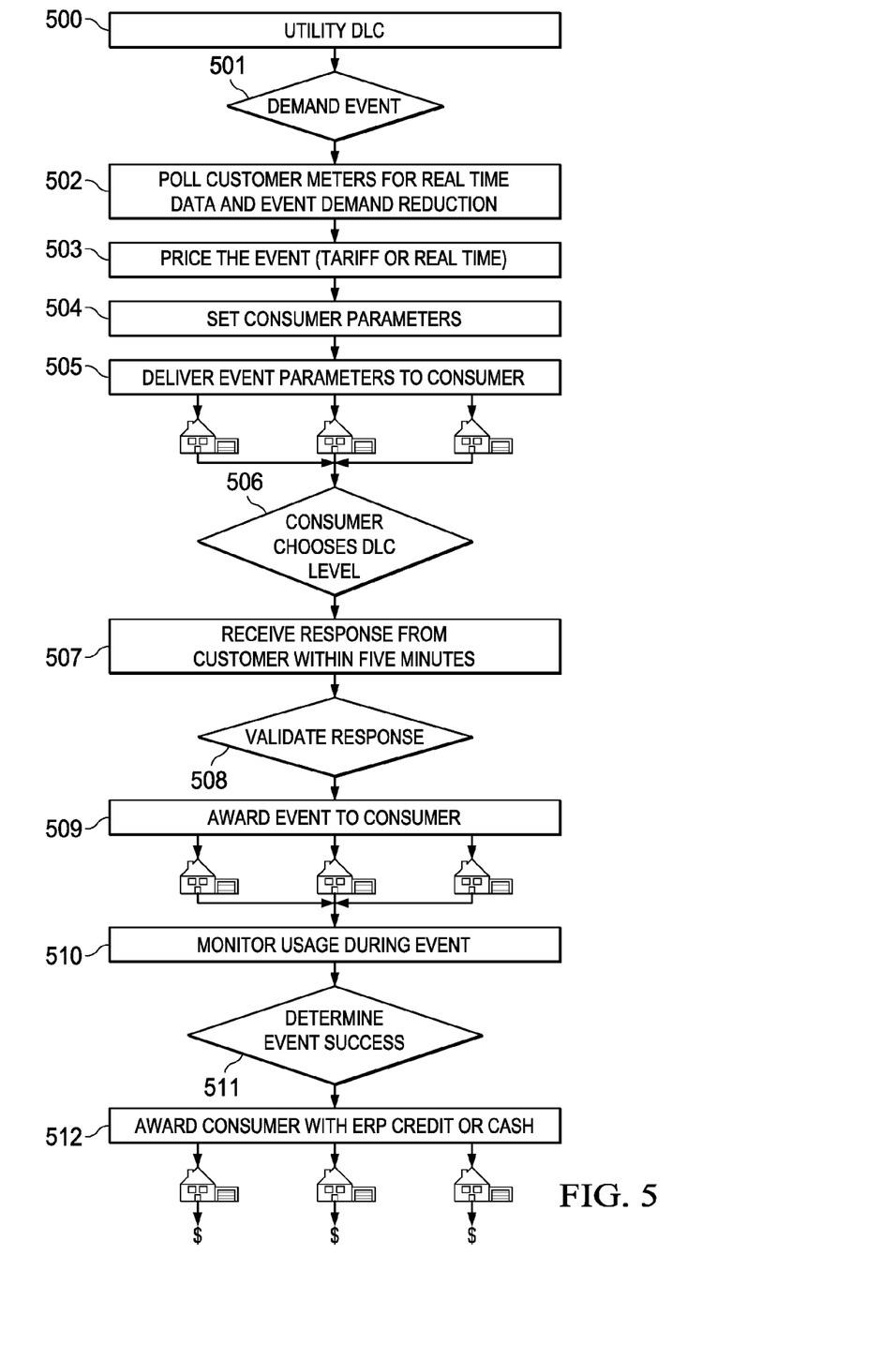
FIG. 5 is a conceptual chart illustrating a representative use of utility meters according to the principles of the present invention in a system environment.

FIG. 5 is a flow chart of a direct load control (DLC) procedure 500 embodying the principles of the present invention. Procedure 500 is preferably implemented using meter unit 100 or collar 101 and WebConnect system 214, although other types of metering units and control systems can be used in alternate embodiments. Furthermore, while procedure 500 is discussed using electric power consumption as an example, it is equally applicable to controlling the consumption of other utility services, such as water and gas.

As shown in Table 1, meter unit 100 and collars 100 can cycle electrical power to customers in selected increments by opening and closing switches 103 (e.g., 30 minutes on and 30 minutes off) in response to wireless commands. Meter 100 and collar 101 can also be used to wireless monitor current consumption and determine when a customer's usage exceeds a certain level. Using these features, a utility company can reward customers for participation in efforts to reduce power consumption during high demand events or emergencies.

For example, a customer can volunteer for a hard disconnect (e.g., whole house disconnect) during a high demand period or emergency ("demand event"), wherein meters 100 and/or collars 101 are used by the utility provider to cycle power to volunteering customers to reduce loading on the grid. Those customers who accept a hard disconnect under demand events are rewarded with a reduction in pricing, credit, or other compensation.

Alternatively, customers can volunteer for a virtual disconnect during a demand event, wherein the customers are given consumption parameters (e.g., a reduced current level, time duration at the reduced current level, and time of day of the reduction) via email or text messaging and then monitored for compliance with those parameters. In this case, the means of power reduction (e.g., shutting off air conditioning, water heaters, pool pumps, and so on) is left to the customer's discretion. Those customers who successfully reduce consumption throughout the event are rewarded, while those who drop out of the event (i.e., fail to reach or maintain the consumption parameters) are not rewarded. (The utility company can similarly control usage through mesh unit 213 and a HAN of given users.)

In procedure 500, the utility company monitors its grid (Block 501) and detects a demand event (Block 501). At Block 502, the utility provider polls the customers for real time consumption data (e.g., current consumption) to determine the extent of the required demand reduction. From this information, the utility company prices the event (Block 503) to determine the amount of reduction required and the amount of rewards needed to achieve that reduction. At Block 504, the utility company determines the consumer parameters required to achieve the necessary reduction and sends those parameters (e.g., a reduced current level, time duration at the reduced current level, and time of day of the reduction), along with the prospective reward, to participating customers at Block 505.

The customer is given options, at Block 506, for load reduction based on the received parameters and prospective reward. For example, customer accepting a greater reduction in current over a longer period of time, which encompasses typically high demand time of day, will receive a greater reward than a customer accepting a smaller reduction in current and/or a short duration of reduced current consumption. The customer can also select between a hard disconnect or virtual disconnect. The customer preferably responds to the utility provider within five (5) minutes (Block 507). (Customers not responding, or not responding in timely fashion, may not be accepted to participate and receive the incentive.)

At Block 508, the utility provider validates the response from the given customer and awards the event to that customer at Block 509. In other words, the utility provider may not require a reduction from all customers within the program to achieve the desired loading on the grid and therefore need only accept a certain number to receive prospective rewards.

Customer usage, particularly those accepting virtual disconnection, are monitored during the demand event at Block 510. If, at Block 511, the event is considered to be a success for a customer (i.e., the customer has met the reduction parameters), the customer is rewarded with cash or credit at Block 512.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

TABLE 1

| Message | Meter Type | Message Type | Function |
| --- | --- | --- | --- |
| OPEN | Both | Command | Unconditionally opens the AC power switches. |
| CLOSE | Both | Command | Closes the AC power switches. |

TABLE 1-continued

| Message | Meter Type | Message Type | Function |
|---|---|---|---|
| ARM | Both | Command | Sets meter into home-owner contact mode allowing contact closure through a manual button press. Illuminates the LED in the home-owner button and is only set when meter unit is in OPEN mode. Meter waits for new command or for button press. |
| CYCLE | Collar | Command | Sets meter unit into a cycle mode, for example, 30 minutes off, 30 minutes on. Meter cycles through OPEN and CLOSE states staying in the OPEN state for 30 minutes, and then swapping to the CLOSE state for 30 minutes. A new OPEN or CLOSE command ends cycle mode. An over current condition will suspend the cycle mode, which is re-started if the meter unit goes in to the ARM mode from the over-current condition whilst in the cycle mode. |
| CYCLE mmmm, pppp | Meter | Command | Sets meter into a cycle mode for mmmm seconds, off for pppp seconds. Meter cycles through OPEN and CLOSE states staying in the OPEN state for mmmm seconds, and then swapping to the CLOSE state for pppp seconds. A new OPEN or CLOSE command ends cycle mode. An over current condition will suspend the cycle mode, which is re-started if the meter goes in to the ARM mode from the over-current condition whilst in the cycle mode. |
| SET_CURRENT aaab | Meter | Command | Sets current limit in range in range 0 to 50A (0 = no limit). Sets a new current limit to aaa amps, where b sets options: 0 = Arm and 1 = Timed five minutes. Meter unit will look at an average current draw over a 10 second window. |
| POLL | BOTH | Command | Commands meter to respond with status update. Meter unit responds with current status including: meter read, current reading, output status, contactor (switch) status, input status, error count, voltage, and signal level. Error count is incremented every time the host meter receives a message it cannot understand and discards (e.g., either random text or a message with corrupted characters). |
| POWER_UP | Both | Unsolicited | When power is applied to the meter unit, it responds by sending the unsolicited power up message. |
| GRID POWER FAILURE | Both | Unsolicited | When power is lost to a meter unit, an unsolicited message is generated with a ST code of (30). |
| SET_VOLTAGE vvv | Meter | Command | Sets a new voltage limit to vvv volts (in range 0 to 360, with 0 = no limit. This limit can be set for High or Low triggering using OpCode VA. Meter will look at an average voltage draw over a 30 second window |
| TAMPER DETECT | Meter | Command | When the meter is turned upside down or moved it increments bits that can be read via the POLL command. |
| TIME OF USE (TOU) ppp | Pre-Pay | Command | Request the time of use via SMS for a meter in 15 min increments, where ppp is the index or packet number to request from the meter. If meter does not have TOU enabled then it will respond with NAK on any request for packet index. |
| TIsss,eee, APN,IP,PORT | Pre-Pay | Command | Request the time of use via IP for a meter in 15 min increments, where: sss is the start index or packet number to request from the meter; and, eee is the end index or packet number to request from the meter. APN is the APN Domain name to use when connecting via IP messaging. IP is the IP address of the Server to Connect to. PORT is the port number to connect on. Response to above will be ACK. If meter does not have TOU enabled then it will respond with NAK on any request for packet index. |

TABLE 1-continued

| Message | Meter Type | Message Type | Function |
|---|---|---|---|
| TYssss | Pre-Pay | | Enables the time of use feature in the meter unit, where ssss is the interval in seconds for time of use collection in meter.<br>Preset values would be:<br>Five Seconds : 0005<br>Ten Seconds : 0010<br>30 Seconds : 0030<br>1 Minute : 0060<br>5 Minute : 0300<br>6 Minute : 0360<br>12 Minute : 0720<br>15 Minute : 0900 * Default<br>20 Minute : 1200<br>30 Minute : 1800<br>60 Minute : 3600<br>Response to above will be ACK |
| TM | Pre-Pay | Command | Disable the Time of use feature in the meter unit. Response to above will be ACK |
| Software Reset | Meter | Command | Software reset of system 200 module,<br>Where mode is:<br>0: Reboot immediately<br>1: Enable/Disable Automatic Reboot<br>Reboot freq is the reboot frequency for automatic reboot (in hours). |
| Query Meter Factor | Meter | Command | Used to retrieve the current meter factor for meters being displayed and read. |
| Mesh Configuration | Meter | Command | Configuration for mesh meter 213. |
| Query Mesh Configuration | Meter | Command | Returns mesh unit 213 ID. |
| Reset Meter | Meter | Command | Reset meter unit reading. |
| Firmware Update | Meter | Command/ Unsolicited | Request a firmware update from the server. |
| General Packet | Meter | Command/ Unsolicited | General packet sent from meter to server using IP protocol. Server responds with packet number requested. |
| Get Version | Both | Command/ Unsolicited | Request the current firmware/ hardware versions. |
| Status | Meter/ Pre-Pay | | STATUS = unsolicited message (00000 message ID) sent to database to indicate specific change of state in meter:<br>10 Account Balance Reached<br>11 Set Level 1 Credit reached(Pre-Pay)<br>12 Set Level 2 Credit reached(Pre-Pay)<br>13 Set Level 3 Credit reached(Pre-Pay)<br>14 Set Level 4 Credit reached(Pre-Pay)<br>15 Set Level 5 Credit reached(Pre-Pay)<br>16 Set Level 6 Credit reached(Pre-Pay)<br>17 Set Level 7 Credit reached(Pre-Pay)<br>18 Set Level 8 Credit reached(Pre-Pay)<br>19 Set Level 9 Credit reached(Pre-Pay)<br>20 Contactor (switches) closed by home owner /ARM button being pressed<br>21 Meter tried to CLOSE contactor (switches) and detected a backfeed condition<br>22 Meter tried to CLOSE contactor and failed<br>23 Meter tried to OPEN contactor and failed<br>30 Grid Power Off Detected<br>40 Current Limit Exceeded. Waiting for Timeout to Connect.<br>41 Current Limit Exceeded. Waiting for home owner button to be pressed. |

TABLE 1-continued

| Message | Meter Type | Message Type | Function |
|---|---|---|---|
| | | 42 | Current Limit Exceeded. Maximum number of retries reach. Manual Connect required. |
| | | 43 | Current Limit Re-Connected after Timeout. |
| | | 60 | Grid Power Off Detected with Tamper |
| | | 70 | Voltage Limit detected |
| | | 71 | Voltage Limit restored |
| | | 80 | Meter Reset Button Pressed. Resetting Kw Hours to Zero |
| | | 90 | Rate Exhausted |

What is claimed is:

1. A utility meter comprising:
  metrology circuitry operable to provide metrology data for an end user;
  a cellular communications network subsystem for exchanging messages with a utility provider via a cellular communications network, the cellular communications network subsystem operable to exchange messages with the utility provider using a SMS messaging protocol and using an internet protocol (IP) messaging protocol, wherein a selection between the SMS messaging protocol and the IP messaging protocol is based on one or more of a message type, an amount of data being transferred, and a frequency of messages; and
  at least one RF subsystem, the at least one RF subsystem operable to communicate with a utility network via a proprietary communication protocol, the at least one RF subsystem further operable to communicate with a home automation network via a standard communication protocol, wherein the utility meter is operable to receive a first plurality of messages from the utility provider via the cellular communications network, communicate with the utility network via the proprietary communication protocol, and communicate with the home automation network via the standard communication protocol, and wherein the utility meter is operable to transmit a second plurality of messages to the utility provider based on the metrology data, the communications with the utility network, or the communications with the home automation network.

2. The utility meter of claim 1, wherein the cellular communications network subsystem comprises a SIM card.

3. The utility meter of claim 1, wherein the utility meter is operable to receive a firmware update via the cellular communications network.

4. The utility meter of claim 3, wherein the utility meter comprises a boot loader operable to be executed by a processor to store the firmware update at the utility meter.

5. The utility meter of claim 3, wherein the utility meter is operable to transmit the firmware update to an additional utility meter of the utility network via the proprietary communication protocol.

6. The utility meter of claim 1, wherein the utility meter is operable to receive a configuration message via the cellular communications network.

7. The utility meter of claim 6, wherein the utility meter is operable to be configured based on the configuration message.

8. The utility meter of claim 6, wherein the utility meter is operable to transmit the configuration message to the utility network via the proprietary communication protocol.

9. The utility meter of claim 1, wherein a selection between the SMS messaging protocol and the IP messaging protocol is based on the message type.

10. The utility meter of claim 1, wherein a wake-up message is provided via the SMS messaging protocol, and wherein one or more components of the utility meter are in a sleep mode prior to receiving the wake-up message.

11. The utility meter of claim 10, wherein the one or more components wake from the sleep mode in response to the wake-up message, and wherein the utility meter exchanges messages with the utility provider via the IP messaging protocol while the one or more components are awake.

12. The utility meter of claim 1, wherein a selection between the SMS messaging protocol and the IP messaging protocol is based on the message size.

13. The utility meter of claim 1, wherein the utility meter is operable to receive data from the utility network via the proprietary communication protocol and provide the received data to the utility provider via the SMS messaging protocol.

14. The utility meter of claim 1, wherein the utility meter is operable to receive commands from the utility provider via the SMS messaging protocol and provide the commands to the utility network via the proprietary communication protocol.

15. The utility meter of claim 14, wherein the commands comprise one or more of a connect message, a disconnect message, a current limiting message, and a duration limiting message.

16. The utility meter of claim 1, wherein the utility meter is operable to receive a command to control a device on the home automation network from the utility provider via the SMS messaging protocol and to communicate with the device via the home automation network to control the device.

17. The utility meter of claim 1, wherein the proprietary communication protocol comprises an electronic receiver transmitter (ERT) protocol, and wherein the standard communication protocol comprises a ZigBee protocol.

18. The utility meter of claim 1, wherein the utility meter is operable to operate for at least one second after power is removed from the utility meter and to transmit a power disruption message via the SMS messaging protocol during the at least one second after power is removed from the utility meter.

19. A utility meter comprising:
a wireless modem configured to communicate with a cellular communications network in a SMS messaging mode and in an IP messaging mode, and wherein a selection of the SMS messaging mode or the IP messaging mode is based on one or more of a message type, an amount of data being transferred, and a frequency of messages;
at least one radio frequency (RF) transceiver, wherein the at least one RF transceiver is configured to communicate via a plurality of protocols, wherein a first protocol of the plurality of protocols is associated with a utility network and a second protocol of the plurality of protocols is associated with a home automation network;
metrology circuitry operable to provide metrology data for an end user;
a plurality of switches operable to control power provided to the end user; and
a processor configured to receive the metrology data from the metrology circuitry, receive a plurality of messages via the wireless modem and the at least one RF transceiver, and operate the plurality of switches to control the power provided to the end user based on the metrology data and at least a first message of the plurality of messages.

20. The utility meter of claim 19, wherein the first message comprises a disconnect message received from a utility provider via the wireless modem or the at least one RF transceiver, and wherein the switches are operable to disconnect power to the end user in response to the disconnect message.

21. The utility meter of claim 19, wherein the processor is further configured to transmit a first control message to control one or more devices within the home automation network via the second protocol, wherein the first control message is based on a second message of the plurality of messages, wherein the second message is received from a utility provider via the wireless modem, and wherein the control of the one or more devices comprises one or more of demand load control, time of use pricing, appliance interactivity, intelligent thermostat control, electric car charging, and reduction in power consumption by appliances.

22. The utility meter of claim 21, wherein the processor is configured to transmit a second control message to the utility network via the first protocol based on a third message of the plurality messages.

23. The utility meter of claim 19, wherein the first protocol comprises an electronic receiver transmitter (ERT) protocol and the second protocol comprises a ZigBee protocol.

24. A utility meter comprising:
a wireless modem configured to communicate with a utility provider via a cellular communications network in an SMS messaging mode and in an internet protocol (IP) messaging mode, and wherein a selection between the SMS messaging mode and the IP messaging mode is based on one or more of a message type, an amount of data being transferred, and a frequency of messages;
a first radio frequency (RF) transceiver, wherein the RF transceiver is configured to communicate with a mesh network;
a second RF transceiver, wherein the second RF transceiver is configured to communicate with a utility network;
metrology circuitry operable to provide metrology data for an end user;
a processor configured to receive the metrology data from the metrology circuitry, receive a first message via the wireless modem, receive a second message via the first RF transceiver, and receive a third message via the second RF transceiver, wherein the power provided to the end user is based on a plurality of the metrology data, the first message, the second message, and the third message.

25. The utility meter of claim 24, wherein the mesh network comprises a home automation network.

26. The utility meter of claim 25, wherein the processor is further configured to control one or more devices of the home automation network based on the metrology data and a fourth message received from the utility provider via the wireless modem.

27. The utility meter of claim 26, wherein the control of the one or more devices comprises one or more of demand load control, time of use pricing, appliance interactivity, intelligent thermostat control, electric car charging, and reduction in power consumption by appliances.

* * * * *